W. H. VANDENBERG.
LUBRICATOR.
APPLICATION FILED MAR. 5, 1914.
1,106,756.
Patented Aug. 11, 1914.
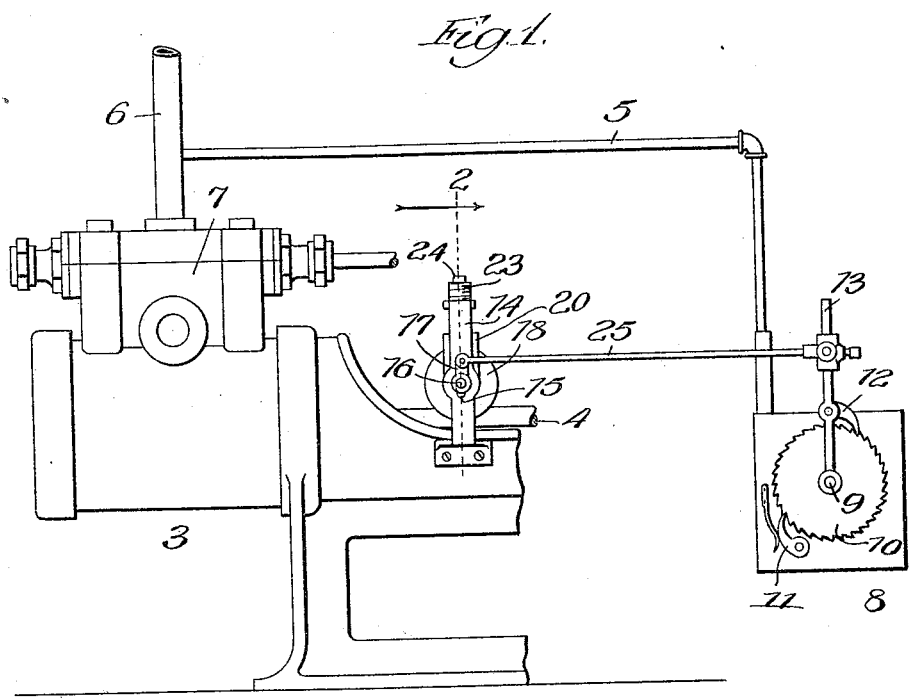
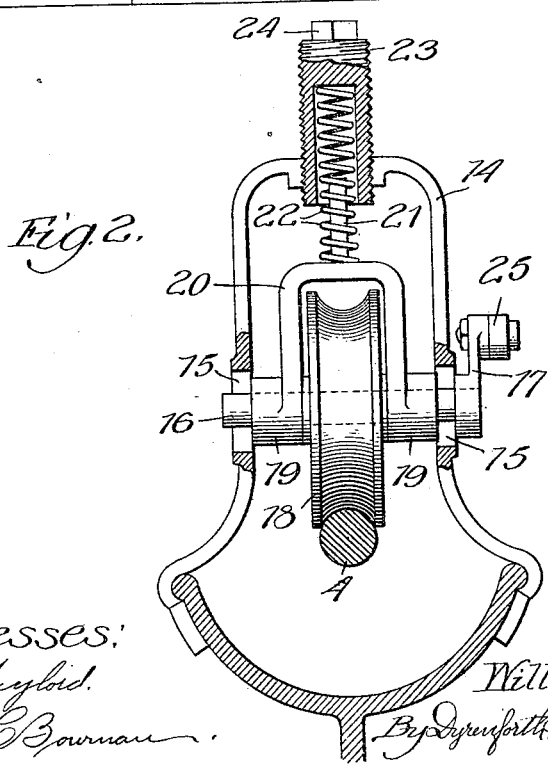
Witnesses:
Inventor:
William H. Vandenberg,
By Dyrenforth, Lee, Chritton and Wiles,
Attys.

UNITED STATES PATENT OFFICE.

WILLIAM H. VANDENBERG, OF CHICAGO, ILLINOIS.

LUBRICATOR.

1,106,756.

Specification of Letters Patent. Patented Aug. 11, 1914.

Application filed March 5, 1914. Serial No. 822,628.

*To all whom it may concern:*

Be it known that I, WILLIAM H. VANDENBERG, a citizen of the United States, residing at Chicago, in the county of Cook and State of Illinois, have invented a new and useful Improvement in Lubricators, of which the following is a specification.

My invention relates to an improvement in the class of apparatus for supplying lubricant to an engine, involving a lubricant-pump operated by the power of the engine to feed to the latter the lubricating oil.

In the accompanying drawing, Figure 1 is a broken view in elevation of a steam-engine and lubricant-pump communicating therewith, showing my improved means for operating the pump by the reciprocating piston-rod of the engine; and Fig. 2 is an enlarged section on line 2, Fig. 1, with parts of the yoke-arms broken away to show vertical slots therein.

A steam-engine 3, which may be of any known type employing a reciprocating piston on a rod 4, which may operate the piston of a water-pump, or the like (not shown), has a pipe-connection 5 from the steam-feed pipe 6 leading into the box 7, with a lubricant-pump 8 of any known or suitable construction employing an operating shaft 9 carrying a ratchet 10 held by a spring-detent 11 and actuated by a pawl 12 on an arm or handle 13 pivotally supported on the shaft.

On the frame of the engine is rigidly supported, in position to straddle the piston-rod 4, a yoke 14 having vertical slots 15 in its arms, in which is journaled a shaft 16 carrying a crank 17 on one end and between its ends a wheel 18, preferably of wood, peripherally grooved to fit downwardly against the rod 4 and be rocked by the reciprocations of the latter. The shaft is surrounded at opposite sides of the wheel by collars 19 on the ends of the arms of a bracket 20 having a stem 21 surrounded by a spiral spring 22 confined in the socket of an elongated nut 23 screwing through the top of the yoke and provided on its upper end with an angular head 24 for application of a suitable wrench to turn the nut and tension the spring for pressing the wheel against the piston-rod as the wheel becomes reduced in diameter by wear. A rod 25 connects the crank with the arm 13.

The diameter of the wheel should be such with relation to the length of stroke of the piston-rod as to be turned, by its frictional contact with the latter, entirely around by each movement of the rod. In the operation of the engine, the reciprocating rod 4, by rocking the wheel, moves the crank and the rod 25 back and forth to rock the handle 13, each movement of which in one direction causes the pawl 12 to turn the ratchet and work the pump 8 to force lubricant through the pipe 5 into the steam-line 6.

My improved means for thus operating the lubricant-pump are of simple construction and noiseless, causing no added burden to or wear and tear on the engine; and the wheel, which is stably supported to always occupy the same position, may be readily replaced, when worn out, by a new one at slight cost.

What I claim as new and desire to secure by Letters Patent is:—

1. Mechanism for operating an engine-lubricating pump by the reciprocating action of the engine-piston, comprising a wheel supported to bear against and be rocked by the reciprocating piston-rod, a crank connected with the wheel, and a rod connected with the crank for operating the pump.

2. Mechanism for operating an engine-lubricating pump by the reciprocating action of the engine-piston, comprising a yoke, a shaft-journaled on the yoke and carrying a crank and a wheel to bear against and be rocked by the reciprocating piston-rod, and a rod connected with the crank for operating the pump.

3. Mechanism for operating an engine-lubricating pump by the reciprocating action of the engine-piston, comprising a yoke having slots in its arms, a shaft-journaled in said slots and carrying a crank and a wheel to bear against and be rocked by the reciprocating piston-rod, and a rod connected with the crank for operating the pump.

4. Mechanism for operating an engine-lubricating pump by the reciprocating action of the engine-piston, comprising a yoke having slots in its arms, a shaft journaled in said slots and carrying a crank and a wheel to bear against and be rocked by the reciprocating piston-rod, a bracket supported on the shaft, a nut adjustably supported on the yoke, a spring confined by the nut against the bracket, and a rod connected with the crank for operating the pump.

WILLIAM H. VANDENBERG.

In presence of—
 LOUISE HEISLAR,
 E. D. STUB.

Copies of this patent may be obtained for five cents each, by addressing the "Commissioner of Patents, Washington, D. C."